Dec. 3, 1929.  W. G. PHILLIPS  1,737,678
AUTOMATIC ADJUSTABLE ROPE TIE
Filed Oct. 4, 1928
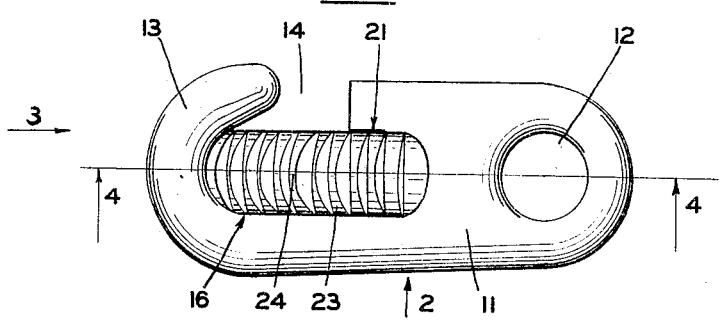
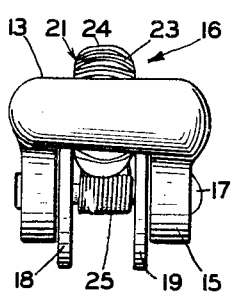
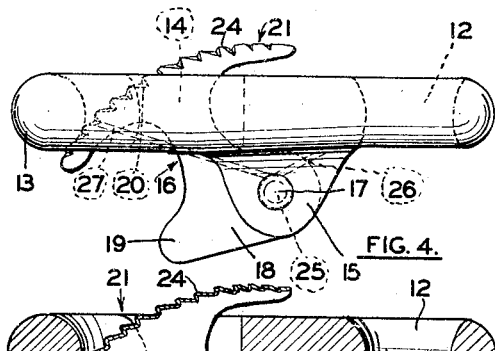
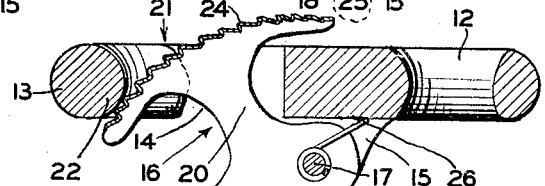
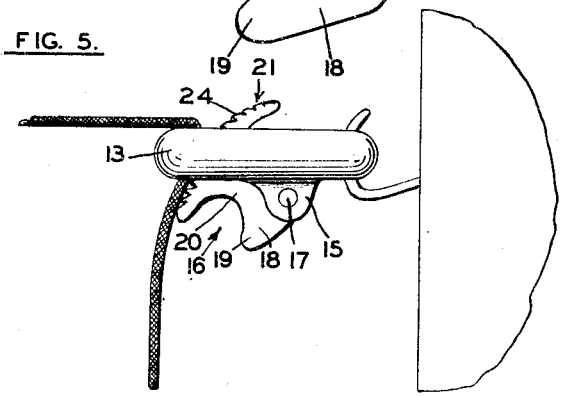
INVENTOR
WILLARD G. PHILLIPS
BY
ATTORNEYS Patented Dec. 3, 1929

1,737,678

UNITED STATES PATENT OFFICE

WILLARD G. PHILLIPS, OF HOLLYWOOD, CALIFORNIA

AUTOMATIC ADJUSTABLE ROPE TIE

Application filed October 4, 1928. Serial No. 310,201.

My invention is an automatic adjustable rope tie.

An object of my invention is a rope tie having a pivotally mounted dog or latch which engages a rope between a fixed structure and the dog and prevents it from slipping when a strain is pulled on a rope against the action of the dog, but in which the dog releases to allow taking in slack of the rope.

Another object of my invention is a rope tie in which the rope may be slipped into a link-like structure through an opening in one side and is there engaged by a pivoted dog-like structure against a hook at the end of the link, the dog and the hook structure holding the rope when under tension in one direction, but allowing taking in of the slack by pulling the rope in the other direction.

Another object of my invention in a rope tie having a pivotally mounted dog to engage the rope is in the shape of the dog in reference to the complementary gripping surface and the teeth of the dog whereby the tighter the pull on the rope the tighter the rope is gripped; but a pull on the rope in the opposite direction immediately releases the grip.

Another object of my invention is in having the dog shiftable to completely open the space on a side of the link to allow ready insertion of the rope and in utilizing a light spring pressure on the dog to normally bring it into engagement with the rope whereby the device may be used either side up and still form an effective rope tie.

In constructing my rope tie I utilize a link-like structure with an eye at one end to attach to a fixture and a hook on the other end open at one side. The link is provided with a pair of ears extending outwardly from one side and in these ears there is a pivotally mounted dog which has a curved bearing surface with inclined gripping teeth. A spring engages the dog and the fixed part of the link and normally tends to bring the teeth into engagement with the inside surface of the hook. This construction allows the rope to be readily threaded in the link through the opening in the hook structure at one side and gripped by the dog.

My invention is illustrated in the accompanying drawings, in which:

Figure 1 is a plan of my device taken in the direction of the arrow 1 of Fig. 2, Fig. 2 is a side elevation taken in the direction of the arrow 2 of Fig. 1, Fig. 3 is an end elevation taken in the direction of the arrow 3 of Fig. 1, Fig. 4 is a longitudinal section on the line 4—4 of Fig. 1 in the direction of the arrows, Fig. 5 is a side elevation showing my device in operation, I utilize a link-like structure having an eye 12 at one end and a hook-like structure 13 at the other end, there being an opening 14 allowing access to the hook. A pair of ears 15 extend outwardly from one side of the link, and a gripping dog designated generally by the numeral 16 is mounted on a pintle 17 extending through the ears and through the dog.

The dog structure has a pair of side plates 18 with outwardly extending portions 19 forming a finger grip. There is a narrow neck portion 20 which allows the finger to fit underneath the cam-shaped bridging structure 21 between the side plates. This structure 21 is formed in a curve, as indicated in Figs. 2, 4 and 5, the curvature being such that a comparatively large rope may be gripped at one end and a small cord at the other end between the cam surface and the inside portion 22 of the hook 13.

Considered transversely the cam structure has a convex curve as indicated at 23 and is provided with teeth 24. These teeth are formed somewhat stepped, and are of such a shape that when a rope is gripped between the dog and the inside of the hook the flat portion of the teeth point substantially at the hook and thus prevent cutting of the rope or cord. A spring 25 is preferably coiled on the pintle 17 and has a free end 26 engaging the body portion of the link and the other end 27 engaging a part of the dog, thereby always tending to close the dog against the hook.

In the use of my device the eye 12 may be utilized to secure the link to a fixed structure or the like, and a rope is readily introduced through the opening 14 by pressing on the finger engaging portions 19 and moving the dog against the action of the spring, thereby removing the dog completely from obstructing the inside of the hook structure of the link. When the rope is drawn over the inside of the hook portion the dog may be released and immediately grips the rope, thus preventing the rope from being drawn through the device against the action of the dog, but allowing it to be readily moved in the opposite direction. If a rope is jammed particularly tight and it is desired to release it, it is preferable to release the pressure slightly and then the dog may be readily moved by the fingers.

Various changes may be made in the principles of my invention without departing from the spirit thereof, as set forth in the description, drawings and claims.

I claim:

1. A rope tie comprising in combination a link-like structure having a longitudinal central opening, and a side opening leading therefrom, ears projecting from one side of the structure, a dog pivotally mounted in said ears and having a cam face adapted to move partly through said opening, the cam face beng adapted to engage a rope pressed against one end of the said structure.

2. A rope tie as claimed in claim 1, the dog having an outwardly extending portion with a narrow neck between said portion and the cam face, the said portions being adapted to form a finger grip.

3. A rope tie comprising in combination a link-like structure having a longitudinal central opening, a dog having a pair of side plates with a cam-shaped bridging structure, the cam shaped structure being adapted to pass partly through said opening and to engage a rope pressed against the end of the said structure.

4. A rope tie as claimed in claim 3, the link structure having an opening at one side for insertion of the rope.

5. A rope tie as claimed in claim 3, the dog being mounted on a pivot pin, and a spring coiled on said pin engaging the link-like structure and the dog normally tending to move the dog into a position for engaging the rope.

6. A rope tie comprising in combination a link-like structure having a longitudinal central opening, and a side opening leading therefrom, one end of the link having a curved surface on the inside, a dog pivotally mounted on one side of the structure and having a cam surface to swing through said opening, the said cam surface having a convex curve transversely of the face and being adapted to grip a rope between the face and the curved surface of the link.

7. A rope tie as claimed in claim 6, the cam surface being curved convexly in a longitudinal direction and having gripping teeth on its surface.

8. A rope tie comprising in combination a hook-like structure having a longitudinal central opening and a passage therethrough at one side, a dog mounted on a pivot pin on one side of the said structure and having a pair of side plates with a bridging cam surface connecting the plates, said cam surface being curved convexly in a longitudinal direction, having teeth thereon, and a spring interengaging the structure and the dog to shift the cam surface into a position to engage a rope between such surface and an inner surface of the hook structure.

In testimony whereof I have signed my name to this specification.

W. G. PHILLIPS.